(12) United States Patent
Yui

(10) Patent No.: US 10,467,826 B2
(45) Date of Patent: Nov. 5, 2019

(54) DUMP TRUCK

(71) Applicant: Komatsu Ltd., Minato-ku, Tokyo (JP)

(72) Inventor: Daichi Yui, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/756,334

(22) PCT Filed: Mar. 16, 2016

(86) PCT No.: PCT/JP2016/058416
§ 371 (c)(1),
(2) Date: Feb. 28, 2018

(87) PCT Pub. No.: WO2017/158781
PCT Pub. Date: Sep. 21, 2017

(65) Prior Publication Data
US 2018/0247470 A1  Aug. 30, 2018

(51) Int. Cl.
*B62D 33/02* (2006.01)
*G07C 5/08* (2006.01)
*B60K 11/04* (2006.01)
*G05D 1/00* (2006.01)
(Continued)

(52) U.S. Cl.
CPC ............ *G07C 5/0825* (2013.01); *B60K 11/04* (2013.01); *B60K 35/00* (2013.01); *G05D 1/0011* (2013.01); *B60K 2370/797* (2019.05); *B60P 1/04* (2013.01)

(58) Field of Classification Search
CPC ...... G07C 5/0825; B60K 11/04; B60K 35/00; B60K 2350/924; G05D 1/0011; B60P 1/04
See application file for complete search history.

(56) References Cited

U.S. PATENT DOCUMENTS

| 5,564,519 A | 10/1996 | Katoh et al. |
| 6,578,925 B1 | 6/2003 | Baker et al. |

(Continued)

FOREIGN PATENT DOCUMENTS

| CA | 2940597 | 6/2018 |
| CN | 1168840 | 12/1997 |

(Continued)

OTHER PUBLICATIONS

International Search Report in International Application No. PCT/JP2016/058416, dated May 31, 2016, 9 pages (with partial English translation).

(Continued)

*Primary Examiner* — Lori L Lyjak
(74) *Attorney, Agent, or Firm* — Fish & Richardson P.C.

(57) ABSTRACT

A remotely controllable dump truck includes: a chassis; pairs of tires each provided at a front side and a rear side in a travel direction of the chassis; fenders for the tires; and a vehicle-status-output device disposed between a front one of the fenders and a rear one of the fenders, the vehicle-status-output device including a control panel for outputting status information of the vehicle. The vehicle-status-output device is positioned, in a width direction of the chassis orthogonal to the travel direction, to be offset from ends of the front and rear one of the fenders in the width direction, and the control panel faces an outside of the tires in the width direction.

8 Claims, 6 Drawing Sheets

(51) Int. Cl.
*B60K 35/00* (2006.01)
*B60P 1/04* (2006.01)

(56) References Cited

U.S. PATENT DOCUMENTS

| | | | | |
|---|---|---|---|---|
| 6,764,130 | B1* | 7/2004 | Hull | B60J 5/108 |
| | | | | 296/186.4 |
| 6,783,187 | B2 | 8/2004 | Parsons | |
| 2002/0175009 | A1* | 11/2002 | Kress | B60K 7/0007 |
| | | | | 180/199 |
| 2008/0188954 | A1* | 8/2008 | Thomson | G05B 19/409 |
| | | | | 700/17 |
| 2012/0158910 | A1* | 6/2012 | Cooper | H04L 67/1097 |
| | | | | 709/219 |
| 2014/0222971 | A1* | 8/2014 | Cooper | H04L 67/12 |
| | | | | 709/219 |
| 2014/0231153 | A1 | 8/2014 | Fukasu et al. | |
| 2014/0240506 | A1* | 8/2014 | Glover | H04N 7/181 |
| | | | | 348/159 |
| 2015/0093961 | A1* | 4/2015 | vom Scheidt, Jr. | A63H 17/00 |
| | | | | 446/454 |
| 2015/0299981 | A1* | 10/2015 | Hayashi | E02F 9/0866 |
| | | | | 180/309 |
| 2016/0299766 | A1 | 10/2016 | Shitaya et al. | |
| 2017/0166022 | A1* | 6/2017 | Springer | B60D 1/242 |
| 2019/0082011 | A1* | 3/2019 | Cooper | B61C 17/12 |

FOREIGN PATENT DOCUMENTS

| | | |
|---|---|---|
| CN | 105378664 | 3/2016 |
| JP | 02-009868 | 1/1990 |
| JP | 06-258133 | 9/1994 |
| JP | 2013-001362 | 1/2013 |
| JP | 2013-204260 | 10/2013 |
| JP | 5723069 | 4/2015 |
| WO | WO2013065415 | 5/2013 |
| WO | WO2015/159391 | * 10/2015 |

OTHER PUBLICATIONS

International Preliminary Report on Patentability in International Application No. PCT/JP2016/058416, dated Sep. 18, 2018, 6 pages, with English translation.
Canadian Office Action in Canadian Application 2,995,163 dated Aug. 2, 2018, 3 page.
Chinese Office Action in Chinese Application No. 201680050918.4, dated Jul. 26, 2019, (English Translation) 3 pages.

* cited by examiner

DUMP TRUCK

CROSS-REFERENCE TO RELATED APPLICATIONS

This application claims priority to International Application No. PCT/JP2016/058416 filed on Mar. 16, 2016, the contents of which are incorporated herein in their entirety.

TECHNICAL FIELD

The present invention relates to a dump truck.

BACKGROUND ART

Examples of unmanned carriers, which are remotely controlled to travel without a driver in a digging site (e.g. mines), include a dump truck having a dump body covering an entire length and width of a chassis in a plan view (see, for instance, Patent Literatures 1 and 2).

Though the dump truck is capable of traveling by a remote control without a driver, the status information (e.g. residual fuel amount, water temperature of a radiator, hydraulic pressure of hydraulic oil, and malfunction display) of the dump truck sometimes needs to be checked in order for, for instance, inspection.

CITATION LIST

Patent Literature(S)

Patent Literature 1 U.S. Pat. No. 6,578,925 B1
Patent Literature 2 U.S. Pat. No. 6,783,187 B1

SUMMARY OF INVENTION

Problems to be Solved by the Invention

However, the dump trucks disclosed in Patent Literatures 1, 2, which are not designed for an operator to get in, have no component corresponding to an operator's seat (e.g. a cab).

Accordingly, components for displaying the status information of the dump truck such as a display and a meter cannot be disposed in a cab.

In addition, if the status-information-displaying components are provided on an exterior of the vehicle, the presence of the status-information-displaying components has to be taken into account in determining the outermost width for a movement of the vehicle, resulting in an increase in the width and deterioration in the mobility of the vehicle.

An object of the invention is to provide a dump truck provided with an information-output device that allows an easy inspection and check for an operator and is capable of being accommodated within a vehicle width.

Means for Solving the Problems

A remotely controllable dump truck according to an aspect of the invention includes: a chassis; pairs of tires each provided at a front side and a rear side in a travel direction of the chassis; fenders for the tires; and a vehicle-status-output device disposed between a front one of the fenders and a rear one of the fenders, the vehicle-status-output device including a control panel configured to output status information of the vehicle. The vehicle-status-output device is positioned, in a width direction of the chassis orthogonal to the travel direction, to be offset inward from an end of the front one of the fenders and an end of the rear one of the fenders in the width direction, and the control panel faces an outside of the tires in the width direction.

In the dump truck according to the above aspect of the invention, it is preferable that the vehicle-status-output device is positioned in the width direction to be offset inward from side faces of the tires in the width direction.

In the dump truck according to the above aspect of the invention, it is preferable that the vehicle-status-output device is positioned within a width of each of the tires. In the dump truck according to the above aspect of the invention, it is preferable that the control panel includes a display configured to display the status information of the vehicle.

In the dump truck according to the above aspect of the invention, it is preferable that the control panel includes an output terminal configured to output the status information of the vehicle by wire.

The dump truck according to the above aspect of the invention preferably further includes a cooler provided between the pairs of tires, the cooler including a cooling fan and a radiator in a form of a rectangle, in which it is preferable that the vehicle-status-output device is disposed at any one of corners of the rectangle of the radiator.

According to the above aspect of the invention, the vehicle-status-output device is positioned in the width direction inside the region defined by side faces of the tires in the width direction and the control panel is disposed at a position capable of being operated from the outside of the tires in the width direction. Thus, an operator can operate the control panel from the outside of the tires in the width direction, so that an interference of the operator with the tires during an inspection can be prevented.

Further, since the vehicle-status-output device is provided between the front one and rear one of the tires, even when the tires are large, the operator can operate the vehicle-status-output device on the ground.

DESCRIPTION OF EMBODIMENT(S)

Exemplary embodiment(s) of the invention will be described below with reference to the attached drawings.

1. Description of Overall Arrangement of Dump Truck 1

Figure 1:
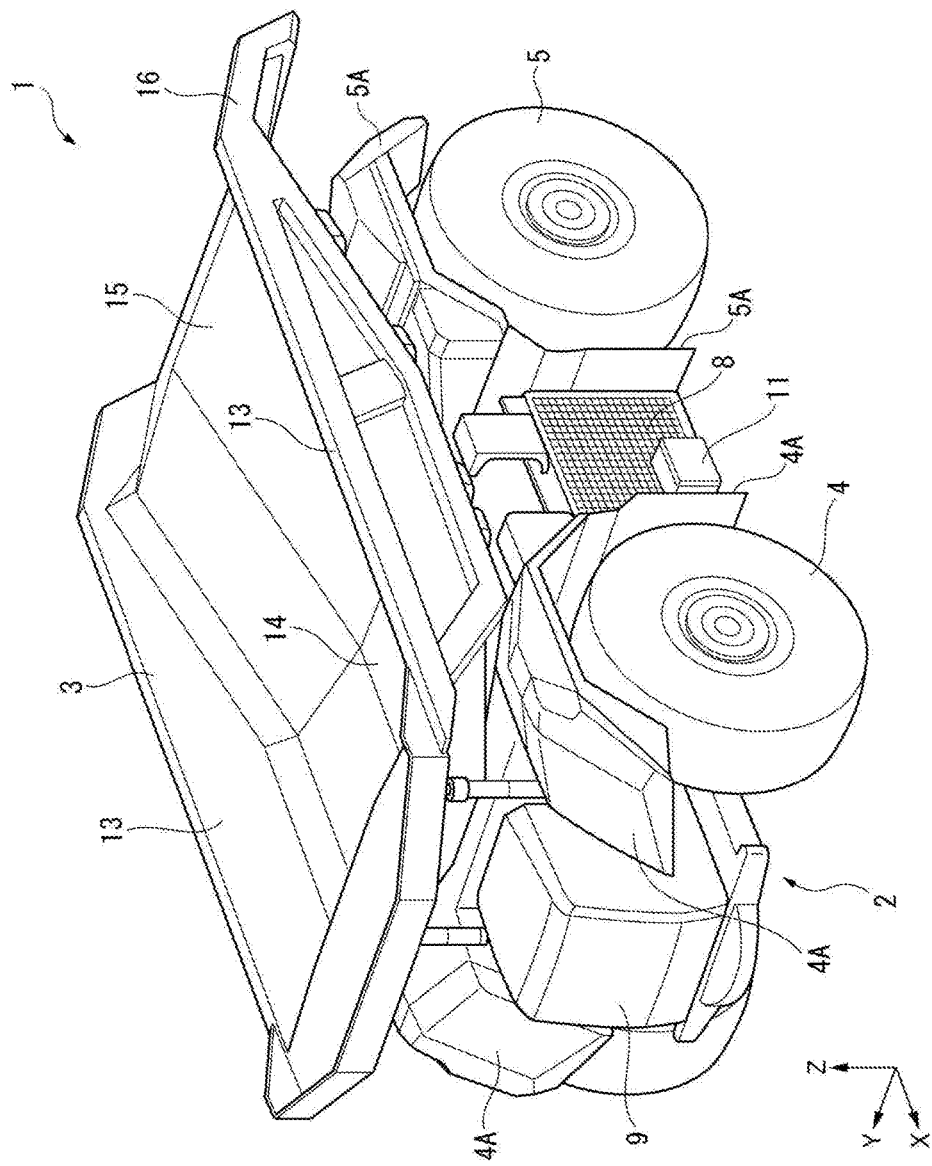
FIG. 1 is a perspective view showing a dump truck according to an exemplary embodiment of the invention.
Figure 2:
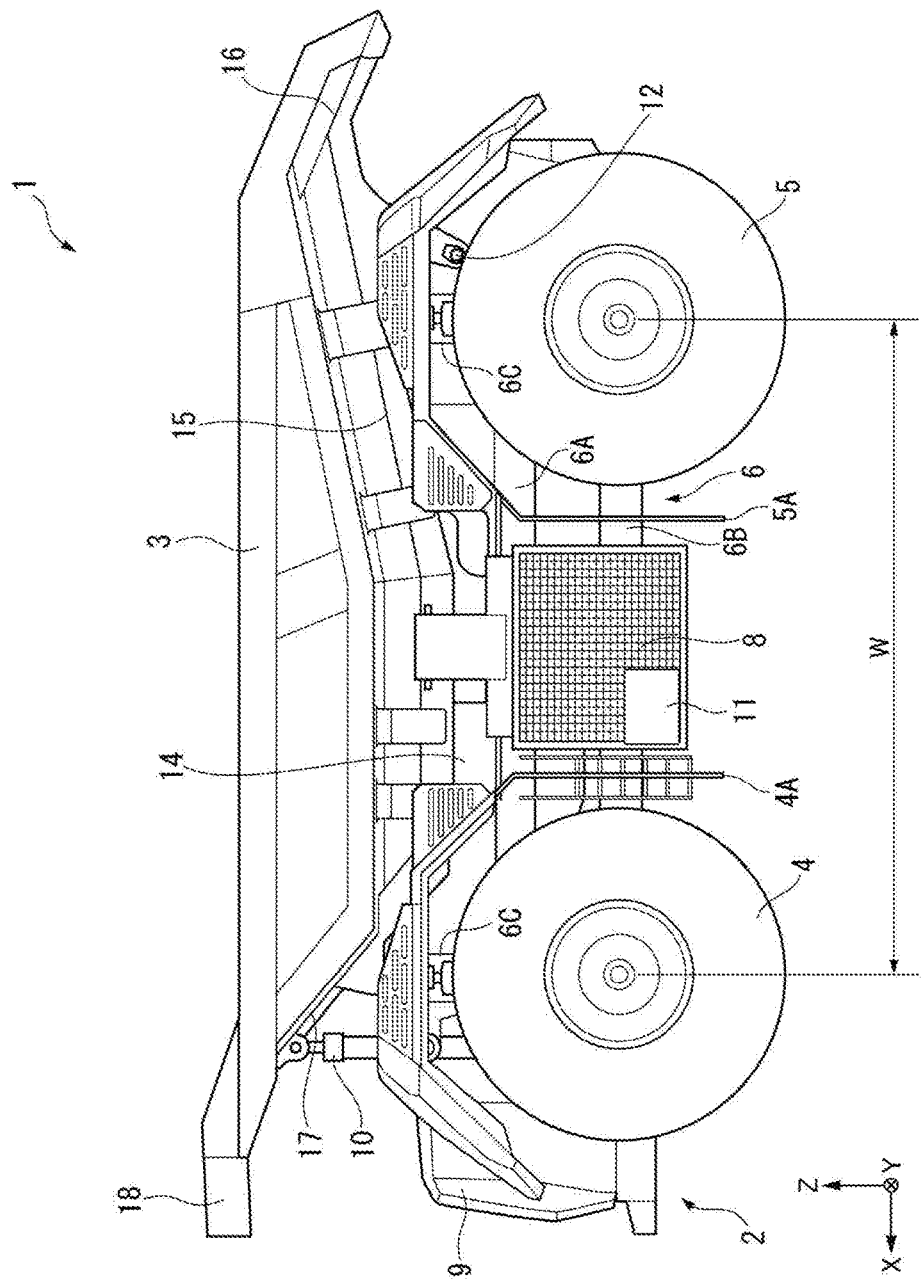
FIG. 2 is a side elevational view showing the dump truck according to the exemplary embodiment.
Figure 3:
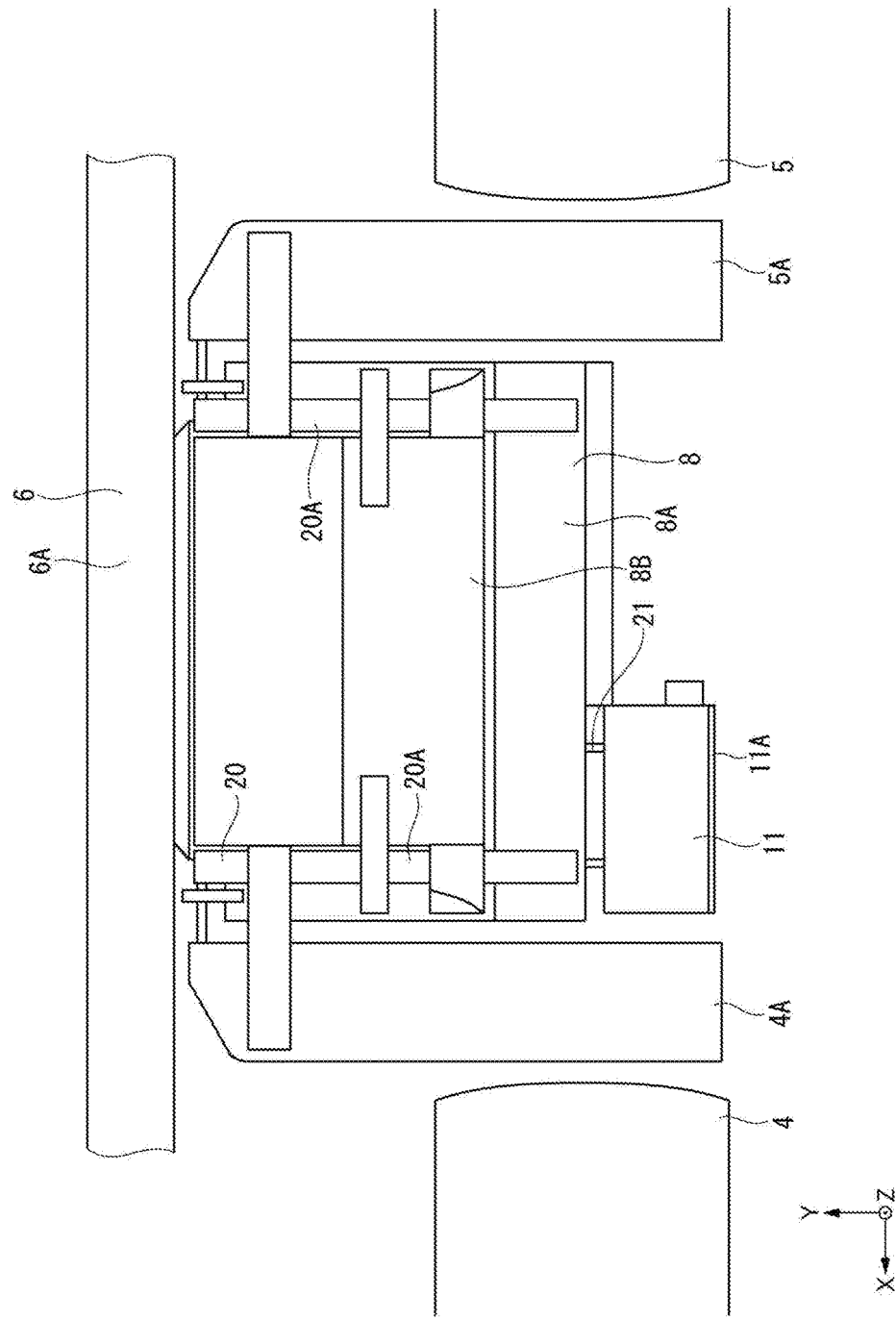
FIG. 3 is a partial plan view showing an attachment structure of a cooling fan according to the exemplary embodiment.

FIGS. 1 to 3 show a dump truck 1 according to an exemplary embodiment of the invention. FIG. 1 is a side elevational view showing the dump truck 1 in a vehicle-width direction orthogonal to a travel direction. FIG. 2 is a side elevational view showing the dump truck 1 in the travel direction. FIG. 3 is a plan view showing the dump track 1 as seen from the above.

It should be noted that X axis, Y axis and Z axis in the exemplary embodiment shown in each of the figures are orthogonal with one another. Further, the travel direction, the vehicle-width direction and a vertical direction are defined as follows for the convenience of description in the exemplary embodiment. Specifically, with reference to FIG. 1, the travel direction of the dump truck 1 is represented by an arrow of the X axis (a first travel direction being defined as a direction indicated by the arrow of the X axis, a second travel direction being defined in the direction opposite thereto); the vehicle-width direction is represented by an arrow of the Y axis (a first vehicle-width direction being defined in the direction indicated by the arrow of the Y axis, a second vehicle-width direction being defined as the direction opposite thereto); and the vertical direction is represented by an arrow of the Z axis (a first vertical direction being defined as a direction indicated by the arrow of the Z axis, a second vertical direction being defined as a direction opposite thereto). It should also be noted that the first travel direction is sometimes referred to as "front"; the second travel direction is sometimes referred to as "rear"; the first vehicle-width direction is sometimes referred to as "right"; and the second vehicle-width direction is sometimes referred to as "left" in the exemplary embodiment below.

The dump truck 1 is a remotely controllable unattended off-road dump truck, which is, for instance, a vehicle operable at a digging site for developing mines. Though detailed later, the remote control is conducted with full use of information and communication technologies such as communication units provided at a control center and the dump truck 1, and the Global Positioning System (GPS).

The dump truck 1 includes a chassis 2 and a dump body 3. The dump truck 1 is configured to travel in both front and rear directions with loads (e.g. earth and sand) being loaded in the dump body 3, and to dump the loads in a −X axis direction (the second travel direction in FIG. 1).

The chassis 2 is configured to travel by being supported by a pair of right and left tires 4, which are provided at a first side of the chassis 2 in the travel direction and arranged side by side in the vehicle-width direction, and a pair of tires 5, which are provided at the second side of the chassis 2 in the travel direction and arranged side by side in the vehicle-width direction. The chassis 2 includes a frame 6 elongated in the travel direction. Each of the tires 4, 5 is attached to the frame 6 via a suspension.

(Flared) fenders 4A, 5A respectively covering the tires 4, 5 are provided to ends of the chassis 2 in the vehicle-width direction.

The frame 6 includes a pair of upper side members 6A and a pair of lower side members 6B at both lateral sides of the chassis 2, the upper and lower side members 6A, 6B extending in the travel direction. Each of the upper side members 6A and corresponding one of the lower side members 6B, which are vertically spaced apart from each other, are connected by a plurality of vertical members 6C at front and rear ends of the upper and lower side members 6A, 6B. The pair of upper side members 6A, which are spaced apart in the vehicle-width direction from each other, are mutually connected by a plurality of upper cross members extending in the vehicle-width direction. The pair of lower side members 6B are mutually connected by a plurality of lower cross members extending in the vehicle-width direction. In other words, the frame 6 forms a rectangular parallelepiped framework as seen in the travel direction of the chassis 2.

An engine 7, a cooler 8, controller 9, an obstacle detection sensor (not shown), a hoist cylinder 10, and a vehicle-status-output device in a form of a remote box 11 are mounted on the frame 6. It should be noted that the dump truck 1, which is a vehicle dedicated for remote control, has no cab for a drive operation as provided in a typical dump truck.

The engine 7 is provided between the upper side members 6A and the lower side members 6B of the frame 6. An upper part of the engine 7 projects beyond the upper side members 6A.

The engine 7 is provided at a rear side of the tires 4 and disposed in a wheel base W defined by rotation centers of the tires 4 and the tires 5. The center of gravity of the dump truck 1 is located substantially at the center of the chassis 2.

As shown in FIG. 2, the cooler 8 is provided between the tires 4, 5, which are respectively disposed at the front and rear sides of the dump truck 1 in the travel direction, to cool the cooling water for the engine 7. It should be noted that the cooler 8 is also disposed at another side of the chassis 2.

The controller 9 is configured to control the travel of the dump truck 1 based on sensor information sent from the obstacle detection sensor provided at a dump end of the chassis 2, a temperature sensor provided to the engine 7, rotation sensors provided to the tires 4, 5 and the like.

The hoist cylinder 10 is provided in a pair (two hoist cylinders) and arranged in the vehicle-width direction at a rear side of the controller 9. A proximal end of each of the hoist cylinders 10 is rotatably connected to the frame 6 and a distal end of each of the hoist cylinders 10 is rotatably connected to a lower face of an end of the dump body 3 opposite the dump end.

The hoist cylinders 10 are operated by a hydraulic oil delivered from a hydraulic pump (not shown), which is provided in the frame 6 and driven by the engine 7.

2. Structure of Dump Body 3

The dump body 3 covers an entire length (i.e. a dimension in the travel direction) and an entire width (i.e. a dimension in the vehicle-width direction) of the chassis 2 in a plan view. The dump end of the dump body 3 extends beyond the end of the chassis 2. As shown in FIG. 3, the dump body 3 is in a form of a rectangular box in the plan view and is mounted on a body mount (not shown).

The frame 6 has an end in the travel direction, i.e. a dump end, where the dump body 3 is attached near a dump end in the travel direction via a hinge 12 in a manner capable of being raised or lowered (i.e. tiltable). The dump body 3 is raised or lowered around the hinge 12 on the frame 6 by an extension and retraction of the above-described hoist cylinders 10.

The dump body 3 includes: a pair of side plates 13 extending along the travel direction of the chassis 2; a bottom 14 provided between bottom edges of the side plates 13; a first inclined portion 15 rising upward from a rear end of the bottom 14; a second inclined portion 16 slanted downward from an upper end of the first inclined portion 15 toward the dump end of the dump body 3; and a front portion 17 rising from an edge of the bottom 14 opposite the edge from which the first inclined portion 15 rises. It should be noted that a horizontally projecting projection 18, which has a length covering the controller 9 in a plan view, is provided to an upper end of the front portion 17. The loads (e.g. earth and sand) are not loaded on the projection 18.

Further, the loads (e.g. earth and sand) are also not loaded on the second inclined portion 16, which is slanted downward toward the dump end of the dump body 3.

3. Structure of Cooler 8

Figure 4:
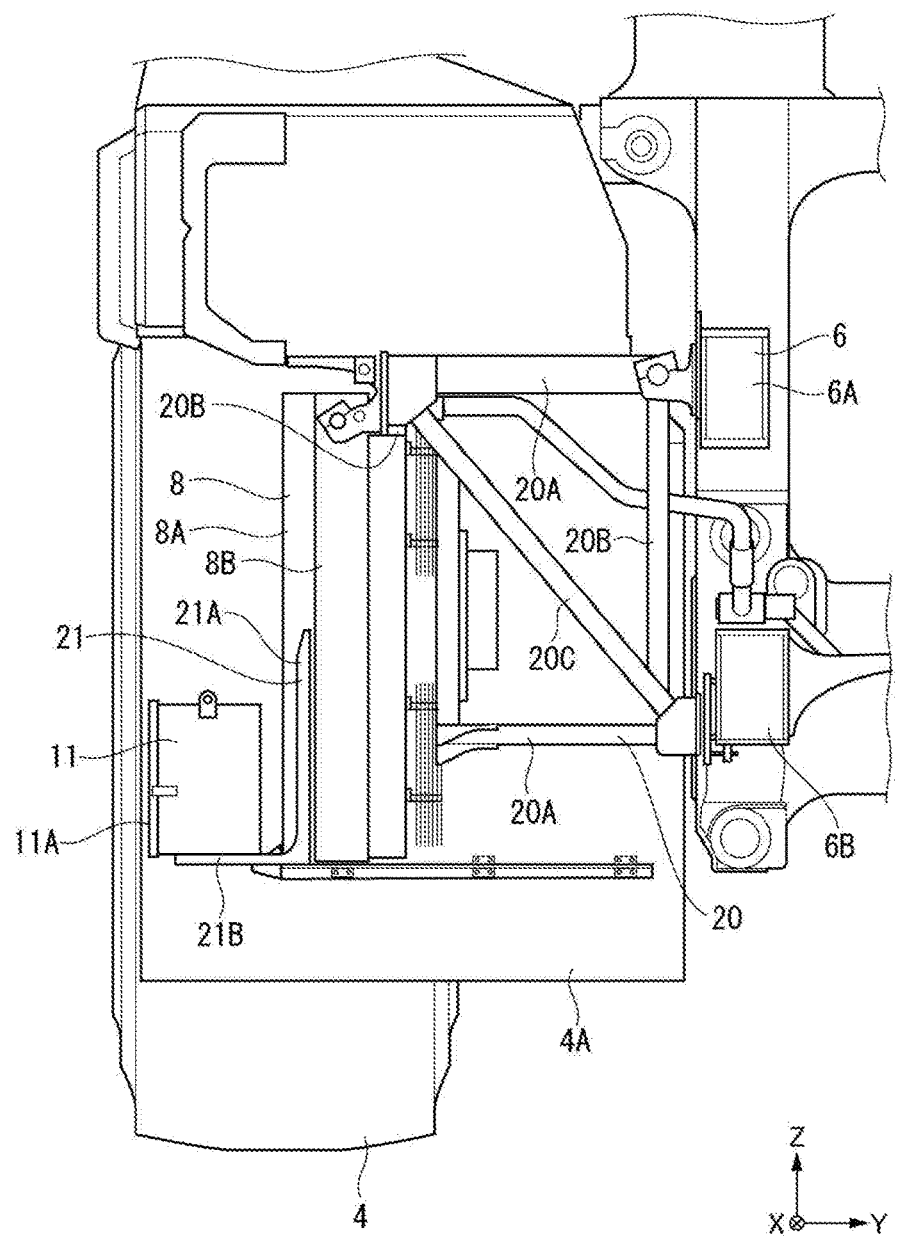
FIG. 4 is a vertical side elevational view showing the attachment structure of the cooling fan according to the exemplary embodiment.

As shown in FIGS. 3 and 4, the cooler 8 is disposed between the tires 4, 5 respectively provided to the front and rear sides in the travel direction, and is surrounded by the front and rear fenders 4A, 5A.

The cooler 8 is cantilevered on one of the upper side members 6A and one of the lower side members 6B of the frame 6 via a box-shaped steel support 20.

The support 20 includes: four transverse members 20A projecting outward in the vehicle-width direction from the one of the upper side members 6A and the one of the lower side members 6B of the frame 6; four vertical members 20B vertically extending along a direction in which the one of the upper side members 6A and the one of the lower side members 6B are spaced; and a diagonal member 20C connecting a projection tip of an upper one of the transverse members 20A and a projection base of a lower one of the transverse members 20A.

The support 20 has an end in the projecting direction, where the cooler 8 is provided, and reaches a substantial center of the width of each of the tires 4, 5 to be offset from a side face of the frame 6.

The cooler 8 includes a radiator 8A substantially defining a rectangle in a plan view and a cooling fan 8B having a circular outer profile, the cooling fan 8B being disposed behind the radiator 8A.

Though not illustrated, the radiator 8A includes a vertically spaced inlet tank and outlet tank, which are each made of a horizontally extending steel pipe, and a plurality of cooling pipes vertically connecting the inlet tank and the outlet tank.

The cooling fan 8B is a suction axial fan disposed at an inner side relative to the radiator 8A. The cooling fan 8B cools the cooling water inside the radiator 8A and also supplies the sucked air into the frame 6 to supplementarily cool the machinery including the engine 7, the hydraulic pump and the like provided in the chassis 2.

A high-temperature water, which is delivered from the engine 7 to the inlet tank, flows in the cooling pipes, where the high-temperature water is cooled by an external air sucked by the cooling fan 8B and is returned from the outlet tank to the engine 7.

4. Structure of Remote Box 11

Figure 5:
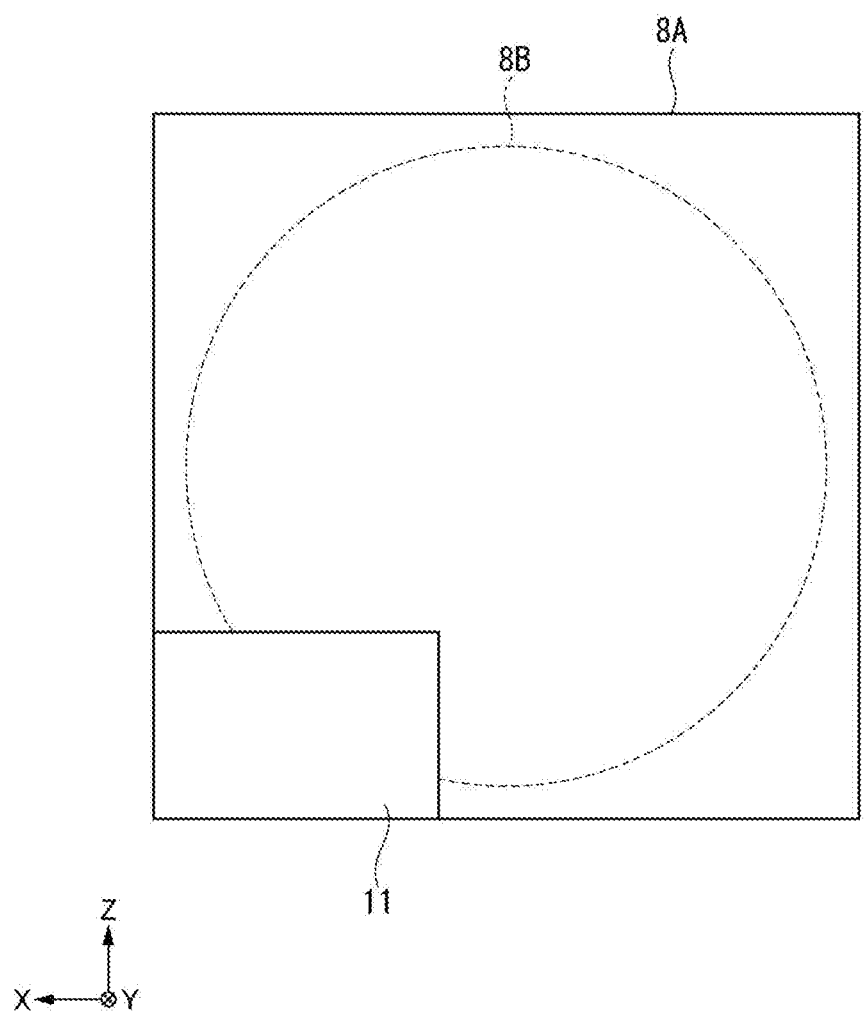
FIG. 5 is a schematic illustration showing a positional relationship between the cooling fan and a remote box in the exemplary embodiment.

The remote box 11 is provided at a front lower corner of a front surface of the cooler 8. The remote box 11 includes a cover 11A (see FIG. 4) and a control panel 11B (see FIG. 6). As shown in the schematic illustration of FIG. 5, the remote box 11 is disposed at a position at which a suction face of the cooling fan 8B is covered as little as possible when the cooler 8 is seen from a front side thereof. Such a placement of the remote box 11 reduces a decrease in the air suction amount of the cooling fan 8B, thereby minimizing a reduction in the cooling efficiency of the cooler 8.

Further, the remote box 11 is located at a height so that the control panel 11B (see FIG. 6) is at 1.1 m to 1.7 m from a ground level. Such a placement of the remote box 11 allows an operator to operate the control panel on the ground, whereby the operator can connect various cables to the control panel 11B to acquire information on the operation status of the dump truck 1.

Further, as shown in FIG. 3, the remote box 11 is located between the fenders 4A, 5A in a front-rear direction. In the vehicle-width direction, the remote box 11 is located within the widths of the tires 4, 5, where the cover 11A of the remote box 11 is offset inward from side surfaces in the vehicle-width direction of the fenders 4A, 5A and/or the tires 4, 5.

The control panel 11B is disposed at a position allowing an operator to operate on the control panel 11B from an outside of the tires 4, 5. Preferably, the control panel 11B is flush with the side surfaces of the tires 4, 5 in the vehicle-width direction or is recessed from the side surfaces by 10 cm to 30 cm.

Such a placement of the remote box 11 allows the operator to operate the control panel 11B from the outside of the tires 4, 5, thereby reliably preventing an interference of the operator with the tires 4, 5.

As shown in FIG. 4, the remote box 11 is attached to the front lower corner of the cooler 8 via a bracket 21.

The bracket 21 includes a pair of vertically extending vertical members 21A, a transverse member (not shown) connecting the pair of vertical members 21A, and supporters 21B projecting from the vertical members 21A outwardly in the vehicle-width direction.

The vertical members 21A bridges the inlet tank and the outlet tank of the radiator 8A of the cooler 8. The vertical members 21A are fixed to the radiator with bolts, which are fastened to internally threaded bases provided to outer circumferential surfaces of the inlet tank and the outlet tank.

The supporters 21B horizontally each project from a lower end of the corresponding one of the pair of vertical members 21A. Though not illustrated, a plurality of cross bars extending in a front-rear direction bridge the supporters 21B.

The remote box 11 is disposed on the plurality of cross members and is fixed to the plurality of cross members by screws or the like.

The remote box 11 is a steel box member. The remote box 11 houses therein the control panel 11B including devices for outputting various operation information (status information of the dump truck 1).

Figure 6:
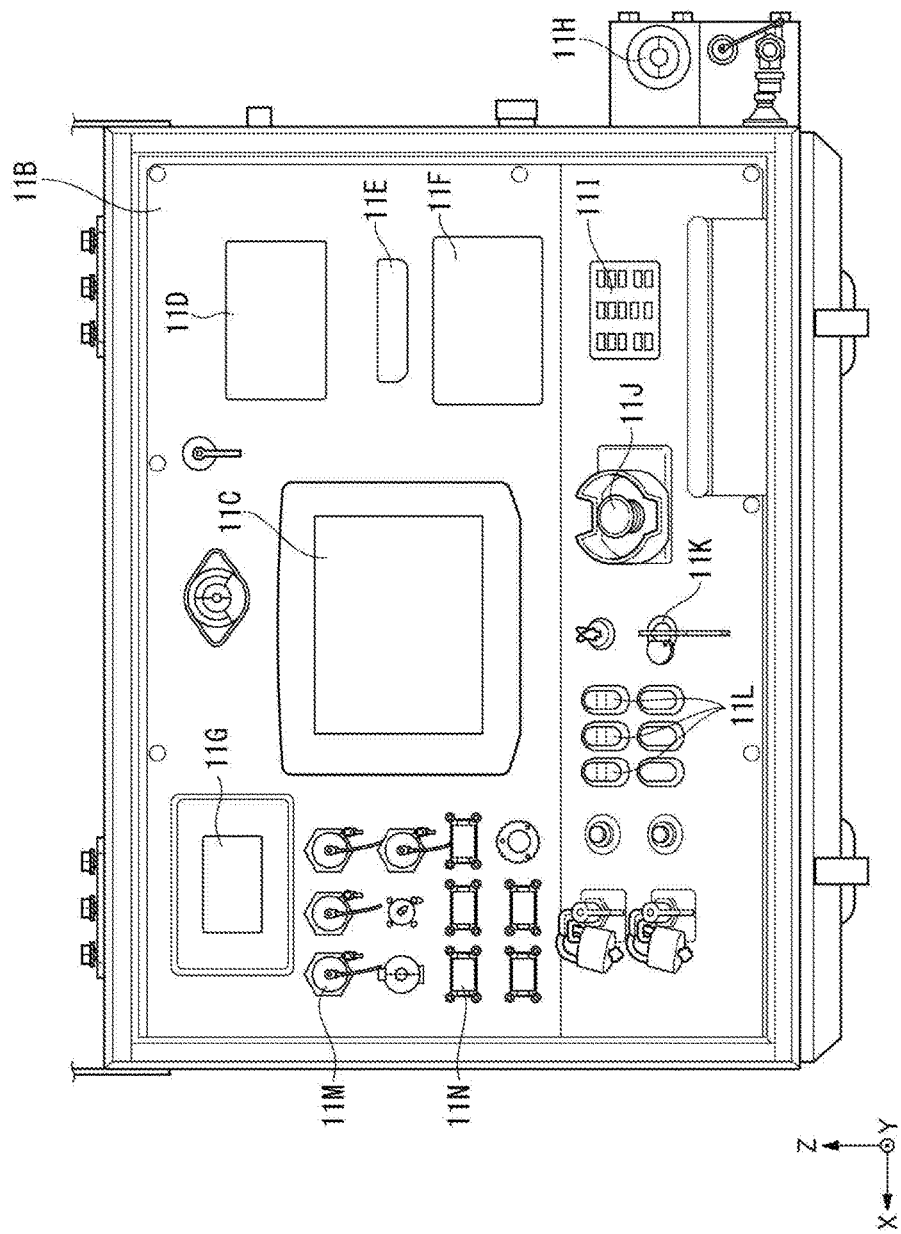
FIG. 6 is a front elevational view showing a layout of components on a control panel in the remote box according to the exemplary embodiment.

FIG. 6 shows the control panel 11B housed in a part of the remote box 11 covered with the cover 11A.

As shown in FIG. 6, the control panel 11B is attached to the remote box 11 via a hinge to be capable of being opened/closed, thereby allowing an inspection of an inside of the remote box 11. It should be noted that an air conditioner is provided inside the remote box 11 to cool the various devices of the control panel 11B and various devices in the remote box 11. The remote box 11 is exposed to an outside and thus is subjected to a severe temperature condition depending on the environment of the digging site. Accordingly, the air conditioner is provided in order to keep an appropriate internal environment of the remote box 11.

Though various touch-panel monitors, switches and output terminals are provided on the control panel 11B, a switch or the like for driving the dump truck 1 is not provided on the control panel 11B.

Specifically, displays in a form of monitors 11C, 11D, 11E, 11F, 11G are provided at an upper part of the control panel 11B. Switches 11H, 11I, 11J, 11K, 11L are provided at a lower part of the control panel 11B. Output terminals 11M, 11N each capable of outputting through a wire are provided on a left side of the control panel 11B.

The monitor 11C, which is a touch-panel multi-monitor configured to display information necessary for wireless control, displays (outputs) operation information during the wireless control and current position information.

The monitors 11D, 11E, 11F, which are configured to display (output) information checked during an operation of an operator, displays engine water temperature, hydraulic oil temperature and residual fuel amount, as well as caution information indicating that the residual fuel amount is running short, the engine water temperature is rising or the like, and other information relating to the operation information.

The monitor 11G displays information such as a surface temperature, pneumatic pressure and the like of the tires 4, 5.

The switch 11H is an emergency stop switch for the engine 7. The switch 11I is an operation switch for the monitor 11F.

The switch 11J is an emergency stop switch for the wireless control. The switch 11K is a switch for turning on the dump truck 1. It should be noted, however, the switch 11K only turns on the power system and cannot drive the engine 7.

The switch 11L is a switch for turning on a hazard lamp, sounding a horn, or turning on a room lamp.

The output terminal 11M is a connector for connecting a LAN cable. Information relating to wireless control can be outputted through the output terminal 11M.

The output terminal 11N is a terminal for outputting information to be outputted/received through a Controller Area Network (CAN) communication connecting the controller 9 with the engine 7, the hydraulic pump and the like in the dump truck 1. Information such as the engine water temperature, hydraulic oil temperature and residual fuel amount can be outputted through the output terminal 11N.

5. Function and Advantage of Exemplary Embodiment

Next, a function of the exemplary embodiment will be described below.

When the remotely controlled dump truck 1 is unexpectedly stopped, the operator opens the cover 11A of the remote box 11 to check the monitors 11C, 11D, 11E, 11F, 11G to find which part of the dump truck 1 has failed. In addition, the operator outputs the information through the output terminals 11M, 11N, as necessary.

At this time, the operator accesses the remote box 11 from an outside of the tires 4, 5 in the vehicle-width direction.

Accordingly, the remote box 11 is provided at the position accessible from the outside. Thus, even when the dump truck 1 is recovered and restarted, the operator, who accesses the remove box 11 from the outside of the tires 4 and 5, can be kept from being interfered with the dump truck 1.

6. Modifications

It should be understood that the scope of the invention is not limited to the above-described exemplary embodiment, but includes modification(s) and improvement(s) as long as an object of the invention can be achieved.

For instance, though the remote box 11 is disposed at a front corner of the radiator 8A in the exemplary embodiment, the remote box 11 may alternatively be disposed at a rear corner. In other words, the remote box 11 may be provided at any position accessible by the operator on the ground as long as the remote box 11 covers the suction face of the cooling fan 8B as little as possible.

Though the monitors 11C, 11D, 11E, 11F, 11G and the like are provided on the control panel 11B in the exemplary embodiment, the monitors are not necessarily provided on the control panel 11B and a personal computer and the like may alternatively be connected to the output terminals 11M, 11N to display the information on the display of the computer.

Though the control panel 11B is housed in the remote box 11 in a form of the box in the exemplary embodiment, the remote box 11 is not necessarily configured in a form of a box as long as the control panel 11B and the internal devices can be protected by the remote box 11.

Other specific structure, shape and the like in implementing the invention may be altered in any manner as long as an object of the invention can be achieved.

The invention claimed is:

1. A remotely controllable dump truck comprising:
a chassis;
pairs of tires each provided at a front side and a rear side in a travel direction of the chassis;
fenders for the tires; and
a vehicle-status-output device disposed between a front one of the fenders and a rear one of the fenders, the vehicle-status-output device comprising a control panel comprising a device configured to output and display status information of the dump truck, wherein
the vehicle-status-output device is positioned, in a width direction of the chassis orthogonal to the travel direction, to be offset inward from an end of the front one of the fenders and an end of the rear one of the fenders in the width direction, and
the control panel faces an outside of the tires in the width direction.

2. The dump truck according to claim 1, wherein
the vehicle-status-output device is positioned in the width direction to be offset inward from side faces of the tires in the width direction.

3. The dump truck according to claim 1, wherein
the vehicle-status-output device is positioned within a width of each of the tires.

4. The dump truck according to claim 1, wherein
the control panel comprises a display configured to display the status information of the dump truck.

5. The dump truck according to claim 1, wherein
the control panel comprises an output terminal configured to output the status information of the dump truck by wire.

6. A remotely controllable dump truck comprising:
a chassis;
pairs of tires each provided at a front side and a rear side in a travel direction of the chassis;
fenders for the tires;
a vehicle-status-output device disposed between a front one of the fenders and a rear one of the fenders, the vehicle-status-output device comprising a control panel comprising a device configured to output and display status information of the dump truck; and
a cooler provided between the pairs of tires, the cooler comprising a cooling fan and a radiator in a form of a rectangle,
wherein the vehicle-status-output device is disposed at any one of corners of the rectangle of the radiator,
wherein the vehicle-status-output device is positioned, in a width direction of the chassis orthogonal to the travel direction, to be offset inward from an end of the front one of the fenders and an end of the rear one of the fenders in the width direction, and wherein the control panel faces an outside of the tires in the width direction.

7. The dump truck according to claim 1, wherein
the control panel comprises a plurality of displays configured to display the status information of the dump truck.

8. The dump truck according to claim 1, wherein
the control panel comprises a plurality of switches configured to control operations of the dump truck.

* * * * *